(No Model.)
J. E. HART.
MINING DRILL.
No. 546,098. Patented Sept. 10, 1895.
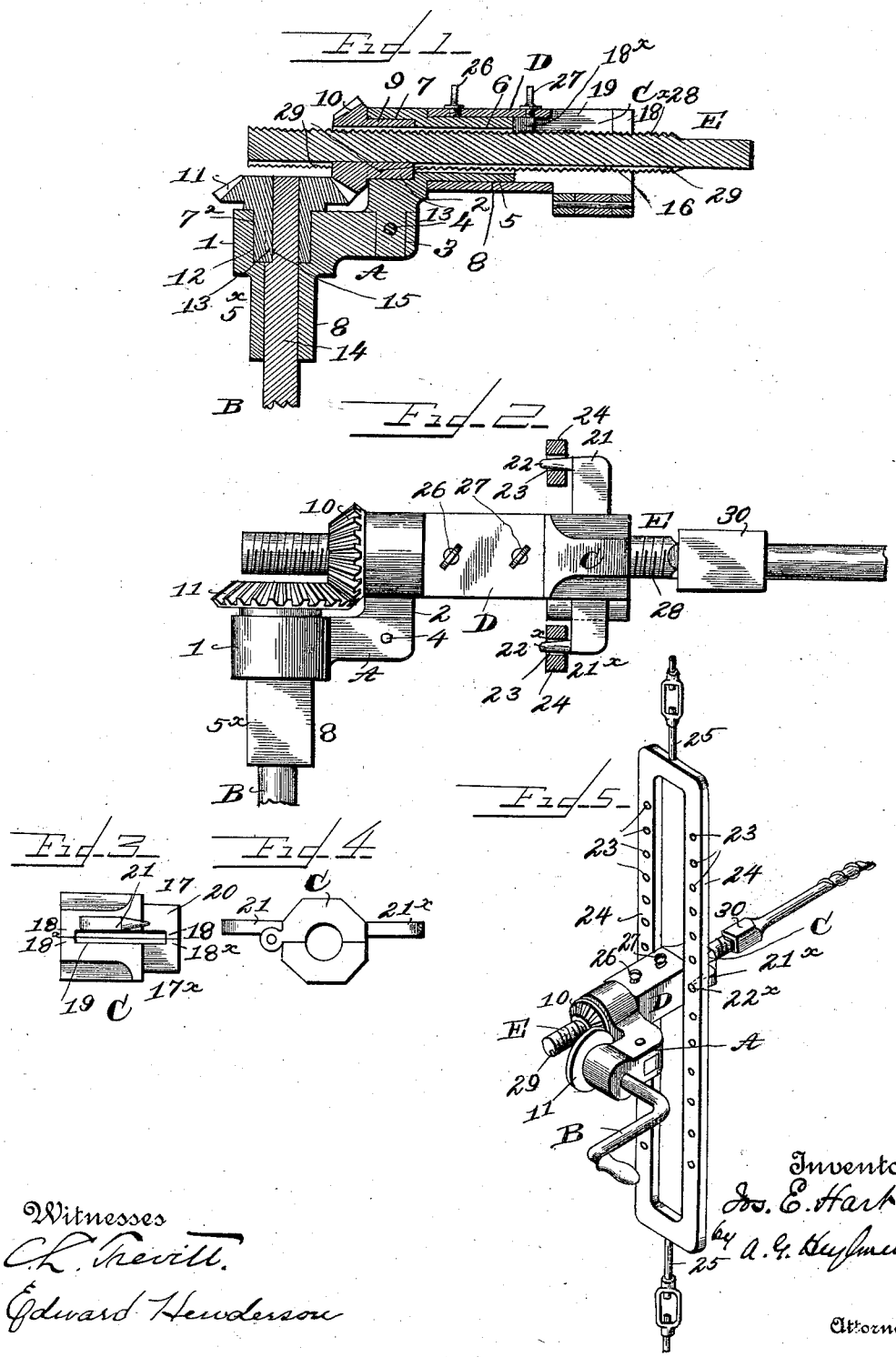
Witnesses
C. L. Merrill
Edward Henderson
Inventor
Jos. E. Hart
by A. G. Husman
Attorney.

UNITED STATES PATENT OFFICE.

JOSEPH E. HART, OF BRICEVILLE, TENNESSEE, ASSIGNOR OF SIX-SEVENTHS TO JOHN E. HART AND DAVID D. JONES, OF SAME PLACE, H. M. MADDEN, OF COAL CREEK, TENNESSEE, AND W. E. THOMPSON, OF IRONTON, OHIO.

MINING-DRILL.

SPECIFICATION forming part of Letters Patent No. 546,098, dated September 10, 1895.

Application filed June 1, 1895. Serial No. 384. (No model.)

*To all whom it may concern:*

Be it known that I, JOSEPH E. HART, a citizen of the United States of America, residing in Briceville, in the county of Anderson, in the State of Tennessee, have invented a new and useful Mining-Drill, of which the following is a specification.

My invention has relation to improvements in mining-drills for boring and drilling rocks, coal, and other formations; and the object is to provide an improved and simplified machine for the purposes mentioned of that construction which will admit of the feed-bar of the drill to be applied to and operated in either of the limbs or parts of the bracket of the supporting-frame for the operating-gearings, so that as occasion may require speed may be exchanged for power or power for speed in the operation.

I have fully and clearly illustrated my invention in the accompanying drawings, wherein—

Figure 1 is a central longitudinal horizontal section through the machine. Fig. 2 is a plan view of the complete machine with the feed-bar and the drill inserted. Fig. 3 is a detail side view of the two-part threaded clamping-box to accomplish the feed of the drill-bar and showing the lugs at the free meeting edges of the sections. Fig. 4 is an end view of the threaded clamping-box. Fig. 5 shows the machine mounted on the post or support in position for operation.

Referring to the drawings, A designates a substantial bracket made of any suitable metal, preferably malleable or cast, and consisting of two parts or sections 1 2 of substantially duplicate construction, united at 3 by means of a mortise and tenon and held and locked together by any suitable fastening, as a key or pin 4. The arm of the part 1 is made longer than the arm of the part 2 in order that the bearings of the former may carry a bevel gear-wheel of larger diameter than the latter. The bracket-arms are formed with sleeves or housings 5 $5^\times$, arranged at right angles to each other and having interior bearings 6 for the passage of the drill feed-bar, and also bearings 7 $7^\times$ to take the hubs of the respective bevel-gears, as hereinafter specified. The exterior of the housings 5 $5^\times$, at the portions designated by 8, are angular in exterior conformation and duplicates in size and dimensions, in order that the coupling-box may be applied to either end portion, as may be required or desired, to couple and attach the bracket to the threaded clamping-box. In the bearing 7 is journaled the hollow hub 9 of the bevel gear-wheel 10, which meshes with a larger bevel gear-wheel 11, having a hollow hub 12, journaled in the bearing $7^\times$ of the housing $5^\times$. The bores of the hubs of the bevel gear-wheels are of the same diameter and equal to the diameters of the bearings in the housings in which the feed-bar passes through. In each hub of the gear-wheels is a spline or rib 13, adapted to engage in a groove in the feed-bar or a similar groove in the crank-arm, as occasion may require in the operative disposition of the machine for faster or slower work.

B designates a crank having an arm 14 fitting in the bore of either housing and hub and having a groove 15 in the arm to engage with the splines in respective hubs and thus lock the hub and arm together, so that the gears may be turned by the crank and the machine operated.

C designates the threaded clamping-box by which the feed-bar is advanced to feed the drill in its work. The interior of this box is provided with screw-threads 16, in which the screw-threads of the feed-rod engage in the well-known manner. This box C is composed of two sections 17 $17^\times$, hinged together in a substantial manner, substantially as shown in the drawings. The opening edges of the sections are formed with lugs or projections 18 $18^\times$, which abut upon each other when the box is closed, leaving an opening, as 19, between the middle portions of the sections. The object of this construction is that when the threads of the feed-bar and the box become worn, so that they do not fit accurately or snugly, the lugs may be reduced in height by grinding or filing them down, and thus make the box again clamp down on the feed-bar. One end, as 20, of the box C is angular and fits in the coupling to hold it in place, and from the sides of the lower section project two arms 21 $21^\times$, similar in construction and having the ends 22 $22^\times$ turned substantially at right angles thereto and tapered, as shown, to readily engage in holes 23 in the side bars of a frame 24, the frame having threaded bars 25 let through the screw-threaded end pieces of the frame, as shown in the drawings, and the operation of which is well understood.

D designates a coupling-sleeve having its interior opening formed to fit over either end of the bracket which supports the bevel-gears, and to take in the angular end of the clamping-box. This coupling is held in connection to either end of the bracket by a set-screw 26 and similarly held to the threaded clamping-box by a set-screw 27.

E designates the feed-bar, provided with screw-threads 28 throughout its length, and engages with the screw-threads in the clamping-box, the engagement causing the progression or withdrawal of the feed-bar according as it may be rotated by the gearings. The rotation of the feed-bar is effected through engagement of a longitudinal groove 29 in the feed-bar with the splines in the hubs of the gear-wheels. The drill and the feed-bar are connected by the usual socket connections 30.

From the foregoing description, taken in connection with the drawings, it will be perceived that I have constructed a machine for drilling and boring rock formations which may be reversed to utilize either leg or limb of the machine for operating the drill, thus enabling me to gain power when hard substances are being drilled and to gain speed when softer substances are drilled. By making the bracket in two parts the machine may readily be taken apart when the wheels require repairing, or to do any other repairing necessary.

To assemble or arrange the machine for operation the post is set at the desired distance from the bank of material to be bored into and then the post is rigidly set and fixed in position by the threaded bars. The frame of the post is set facing the bank to be operated upon. The clamping-box is then detached from the coupling and arranged on the feed-bar and the coupling slipped over the end of the clamp-box and secured thereto by the set-screw. Then, taking the connected coupling and clamping-box with the feed-bar therein, the feed-bar is passed through the opening in the post-frame and the tapering ends of the arms inserted in the selected holes of the frame to support, eventually, the whole machine. One of the legs or limbs of the bracket with the gears is then passed over the feed-rod, with the spline of the hub and the groove of the feed-rod in engagement, until the angular end of the bracket enters into the coupling and is secured therein by the set-screw. The drill-bit is then attached and then the crank is inserted in the other bore of the bracket and gear and the machine is ready for operation.

The machine may be readily and conveniently reversed to attain the purposes specified to increase or decrease the revolution of the feed-bar by simply releasing the set-screw, which holds the coupling and the bracket together, and then sliding the bracket off the feed-bar, then removing the crank and putting the machine in reverse position on the feed-bar to that originally occupied and coupling the parts as specified. The crank is then applied and the machine is again in proper position and condition for use.

Having thus described my invention, what I claim, and desire to secure by Letters Patent, is—

1. The drill-bracket composed of two parts separably connected and having hollow sleeves on the respective ends of the bracket arranged at right angles to each other and formed with angular exterior end-portions of equal size, and bevel gear-wheels formed with hollow hubs journaled in the hollow sleeves of the bracket, substantially as and for the purpose specified.

2. The drill-bracket composed of two parts separably connected formed with hollow sleeves on the ends thereof arranged at right angles to each other and having bearings in the ends thereof, and formed with angular exterior end-portions of equal size, bevel gear-wheels having hollow hubs journaled in the bearings of the hollow sleeves and formed with splines in the bores of the hubs a crank having an arm to interchangeably fit in the hubs of the gear-wheels, and a threaded feed-bar to operatively and interchangeably engage in either of the hollow sleeves and hubs, substantially as and for the purpose specified.

3. In a mining machine, the combination of a bracket having hollow sleeves arranged at right angles to each other, and formed with end portions having identical exterior conformations, bevel gear-wheels having hollow hubs of the same diameter as the bore of the sleeves and provided with splines, a coupling-box adapted to fit on either end of the bracket, a clamping-box having interior screw-threads and an end formed to fit in the clamping box and lateral arms having tapering ends arranged at right angles to the arms, a crank having an arm formed with a groove to engage with the splines in either of the hollow sleeves and the hubs of the bevel gear-wheels, and a threaded feed-bar formed with a longitudinal groove to engage the spline of either of the hollow sleeves and hubs, substantially as and for the purpose specified.

4. In combination, the separable bracket composed of two parts 1, 2, formed with sleeves 5, $5^\times$, arranged at right angles to each other and formed with bearings 6, and hub-bearings 7, $7^\times$, and angular end-portions 8, the bevel gear-wheels having hollow hubs journaled in the bearings 7, $7^\times$, and formed with splines, the interchangeable coupling-box adapted to fit on either of the end portions 8, the two-part clamping-box having interior screw-threads and lateral arms having tapering ends arranged at right angles to the arms, and an exterior conformation to fit in the coupling box, a screw-threaded feed-bar removably and interchangeably fitted in either hub and sleeves and held to rotate with the gear through which it is projected and to engage the threads of the clamping-box, and a crank having an arm to engage in the bore of either sleeve and hub, substantially as and for the purpose specified.

In witness whereof I have hereto set my hand in the presence of two attesting witnesses.

JOSEPH E. HART.

Attest:
C. W. CROSS,
S. L. SLOVER.